United States Patent

Manita et al.

(10) Patent No.: US 8,299,892 B2
(45) Date of Patent: Oct. 30, 2012

(54) ANTITHEFT SYSTEM

(75) Inventors: Masashi Manita, Saitama (JP);
Yoshihisa Shinogi, Saitama (JP); Kosei Yamashita, Saitama (JP); Kenji Kuroiwa, Saitama (JP); Makoto Yamamura, Saitama (JP); Masato Takeda, Saitama (JP); Yoshinori Maekawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 368 days.

(21) Appl. No.: 12/500,400

(22) Filed: Jul. 9, 2009

(65) Prior Publication Data

US 2010/0007459 A1    Jan. 14, 2010

(30) Foreign Application Priority Data

Jul. 10, 2008  (JP) ................. 2008-180556

(51) Int. Cl.
  *G05B 19/00*  (2006.01)
  *G05B 23/00*  (2006.01)
  *H04Q 9/00*   (2006.01)
(52) U.S. Cl. ...................................... 340/5.6
(58) Field of Classification Search ............ 340/5.6
  See application file for complete search history.

(56) References Cited

U.S. PATENT DOCUMENTS

| | | | | |
|---|---|---|---|---|
| 6,077,133 A | * | 6/2000 | Kojima et al. | 440/1 |
| 6,400,254 B2 | * | 6/2002 | Yamamoto et al. | 340/5.6 |
| 6,600,406 B1 | * | 7/2003 | Ha | 340/5.2 |
| 6,963,794 B2 | * | 11/2005 | Geber et al. | 701/2 |
| 7,132,934 B2 | * | 11/2006 | Allison, III | 340/438 |
| 7,222,006 B2 | * | 5/2007 | Proefke et al. | 701/29.6 |
| 2002/0180582 A1 | * | 12/2002 | Nielsen | 340/5.6 |
| 2005/0193198 A1 | * | 9/2005 | Livowsky | 713/168 |
| 2006/0131959 A1 | * | 6/2006 | Nishijima et al. | 307/10.5 |
| 2007/0252675 A1 | * | 11/2007 | Lamar | 340/5.64 |

FOREIGN PATENT DOCUMENTS

| | | |
|---|---|---|
| EP | 0 604 981 A2 | 7/1994 |
| EP | 0 654 383 A2 | 5/1995 |
| EP | 1 067 028 A2 | 1/2001 |

(Continued)

OTHER PUBLICATIONS

Japanese Office Action 2008-180556 with English Translation dated Jul. 25, 2012.

*Primary Examiner* — Daniel Wu
*Assistant Examiner* — Mohamed Barakat
(74) *Attorney, Agent, or Firm* — Arent Fox LLP

(57) ABSTRACT

In a system for preventing an equipment such as lawnmower from theft, there are equipped with an internal combustion engine that is mounted on the equipment and is equipped with a generator that generates electric operating power when the engine is operated, a recoil starter to be manipulatable by an operator to operate the engine, an electronic key that is adapted to be carried by the operator and stores authenticating data for identifying the operator who carries the electronic key; and an authenticator that is installed at the equipment and performs authentication check as to whether the electronic key is an authorized key using stored key-checking data, when the authenticating data is outputted from the electronic key. In the system, the authenticator performs the authentication check when the electric operating power is supplied from the generator, thereby enabling to be installed in battery-less equipment and ensure to prevent the equipment from theft.

8 Claims, 6 Drawing Sheets

FOREIGN PATENT DOCUMENTS

| | | |
|---|---|---|
| GB | 2 382 157 A | 5/2003 |
| JP | 10-016714 A | 1/1998 |
| JP | 2001-146148 | 5/2001 |
| JP | 2004-042872 | 2/2004 |
| WO | WO 01/34439 A1 | 5/2001 |
| WO | WO 0134439 A1 * | 5/2001 |

* cited by examiner

ANTITHEFT SYSTEM

CROSS REFERENCE TO RELATED APPLICATION

This application claims priority Japanese Application No.: 2008-180556, filed Jul. 10, 2008 the disclosure of which is hereby incorporated in its entirety by reference.

BACKGROUND OF THE INVENTION

1. Field of the Invention

This invention relates to an antitheft system, particularly to an antitheft system of equipment, such as an operating machine or moving object, which has a general-purpose internal combustion engine equipped with a power generator that supplies operating power in response to operator's manipulation of a recoil starter.

2. Description of the Related

Various systems have been developed that use an electronic key to prevent theft of a vehicle (a moving object, for example, four-wheeled automobile, etc.). An example of such a system is described in Japanese Laid-Open Patent Application No. H10-16714 (particularly in paragraphs 0016, 0047, FIG. 2 etc.). The antitheft system taught by this reference is installed in a vehicle and configured to enable activation with an electronic key, determine danger of theft from detected vehicle inclination, and respond to the danger by sounding the vehicle horn and cutting off supply of operating power to the ignition circuit. The system is supplied with operating power from a battery installed in the vehicle.

SUMMARY OF THE INVENTION

Such the equipment constituted of the moving object or operating machine (e.g., a lawnmower) is mounted with a general-purpose internal combustion engine equipped with a power generator that supplies operating power in response to operator's manipulation of a recoil starter. Specifically, it is battery-less type equipment. In that case, the aforementioned antitheft system configured to be supplied with operating power from a battery cannot be applied. Although a battery for the system could be newly provided to the equipment, it adversely affects size of the entire equipment and cost.

An object of this invention is therefore to overcome the aforesaid problem by providing an antitheft system that can be installed in battery-less equipment and ensures to prevent the equipment from theft.

In order to achieve the object, this invention provides a system for preventing an equipment from theft, comprising: an internal combustion engine that is mounted on the equipment and is equipped with a generator that generates electric operating power when the engine is operated; a recoil starter that is installed on the engine to be manipulatable by an operator to operate the engine; an electronic key that is adapted to be carried by the operator of the equipment and stores authenticating data for identifying the operator who carries the electronic key; and an authenticator that is installed at the equipment and performs authentication check as to whether the electronic key is an authorized key using stored key-checking data, when the authenticating data is outputted from the electronic key; wherein the authenticator performs the authentication check when the electric operating power is supplied from the generator.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An antitheft system according to an embodiment of the invention will now be explained with reference to the attached drawings.

Figure 1:
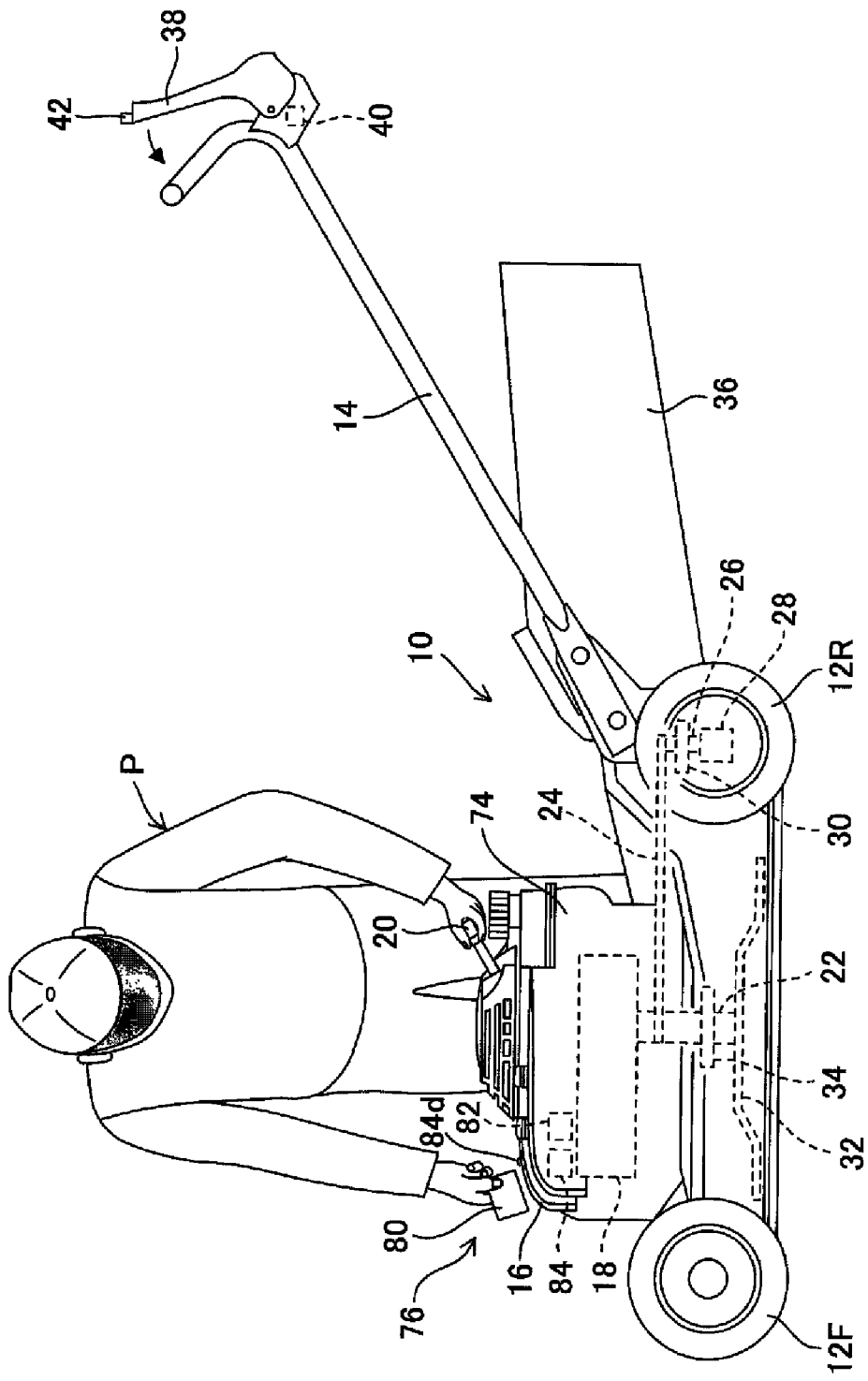
FIG. 1 is an overall view of an antitheft system according to an embodiment of this invention, which is installed in a lawnmower.
Figure 2:
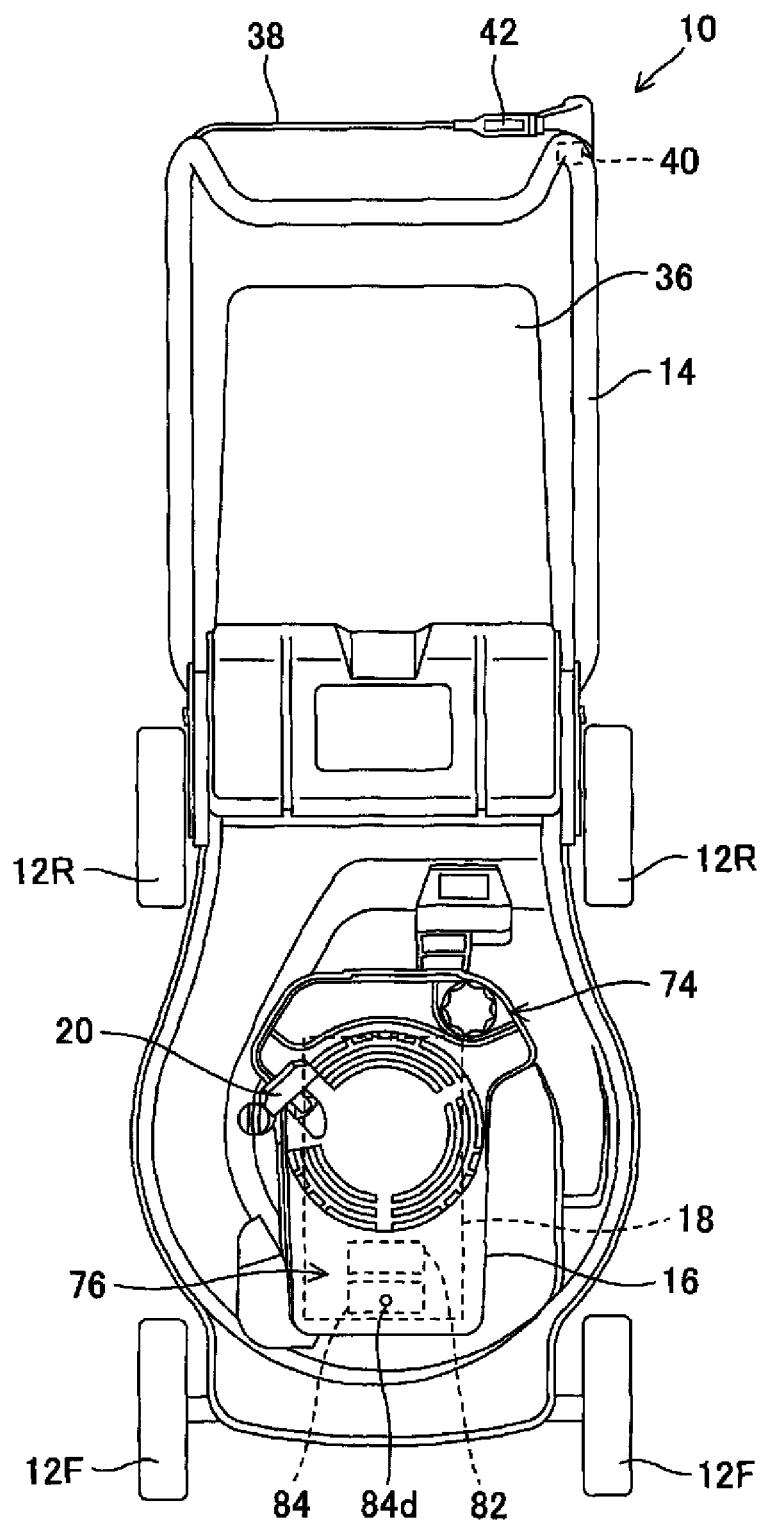
FIG. 2 is a plan view of the lawnmower shown in FIG. 1.

FIG. 1 is an overall view of an antitheft system according to an embodiment of this invention, which is installed in a lawnmower, and FIG. 2 is a plan view of the lawnmower.

In FIGS. 1 and 2, the reference numeral 10 indicates the lawnmower (operating machine; equipment). The lawnmower 10 is a non-riding self-propelled lawnmower with two front wheels 12F and two rear wheels 12R (a total of four wheels), and a handlebar 14. A general-purpose internal combustion engine (hereinafter called "engine") 18 is installed beneath an engine cover 16 on a frame mounted on the four wheels 12F and 12R. The engine 18 is equipped with a recoil starter 20 installed to be manipulatable by the operator P (shown only in FIG. 1).

A crankshaft 22 of the engine 18 is connected to a rear wheel drive axle 26 via a belt 24, as shown in FIG. 1. The drive axle 26 is connected to the rear wheels 12R via a gear mechanism 28. A rear wheel electromagnetic clutch 30 is disposed in the middle of the drive axle 26, and the clutch 30 cuts off the transmission of engine output to the rear wheels 12R.

A grass-cutting blade 32 is mounted on the distal end of the crankshaft 22. A blade electromagnetic clutch 34 is disposed between the blade 32 and the belt 24 in the crankshaft 22, and the clutch 34 cuts off the transmission of engine output to the blade 32. A grass bag 36 is installed in the rear part of the lawnmower 10, so that the grass cut by the blade 32 is collected in the grass bag 36.

A drive lever 38 and a drive switch 40 which produces an ON signal when the drive lever 38 is moved to tilt forward by the operator P in the traveling direction of the lawnmower 10 are installed near the distal end of the handlebar 14. A blade switch 42 is installed on the drive lever 38. The blade switch 42 produces an ON signal when pressed once by the operator P, and terminates producing the ON signal when pressed again.

Figure 3:
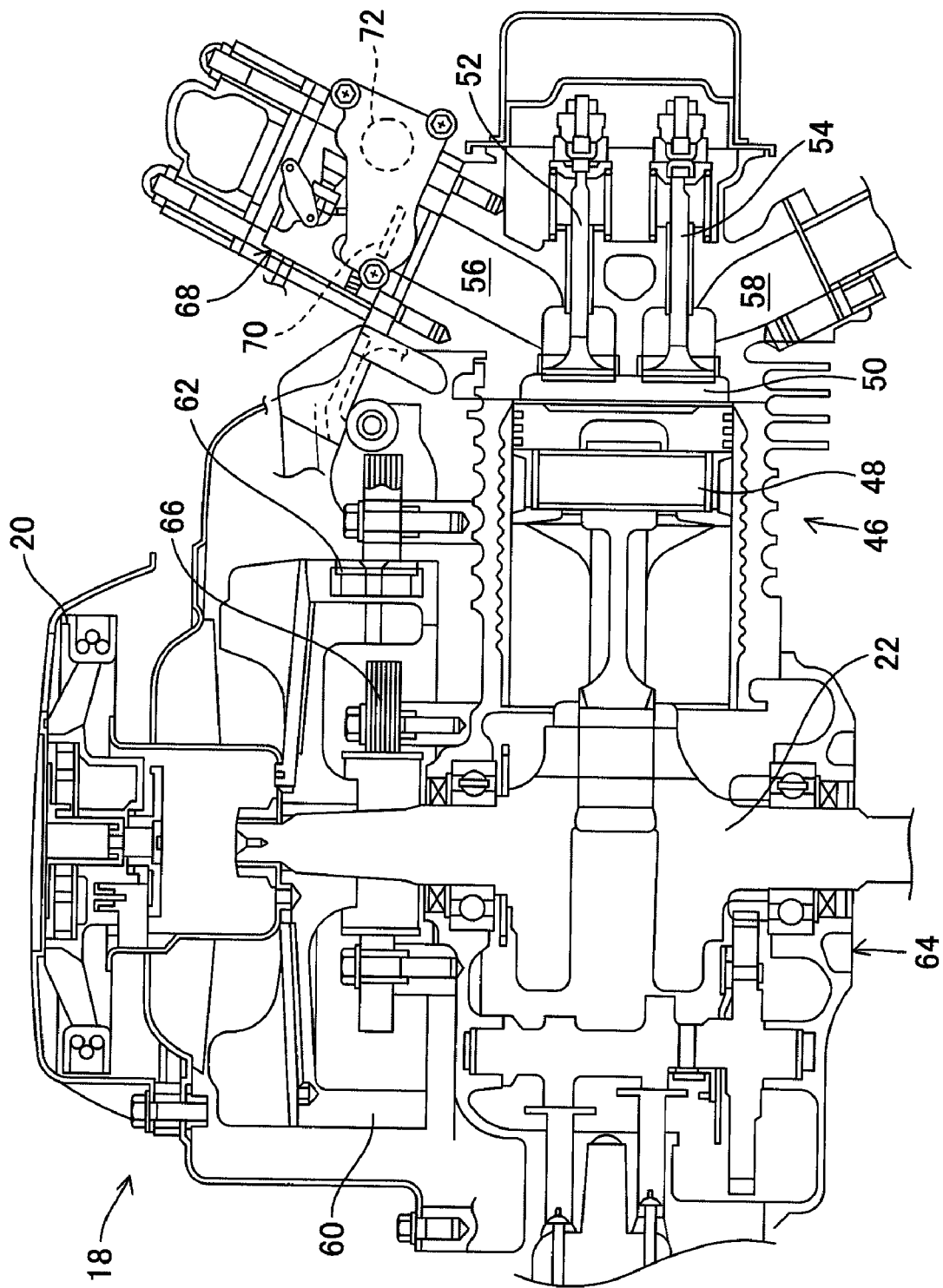
FIG. 3 is an enlarged cross-sectional view of an internal combustion engine shown in FIG. 1.

FIG. 3 is an enlarged cross-sectional view of the engine 18 shown in FIG. 1.

The engine 18 has a cylinder 46, and a piston 48 is accommodated therein to reciprocate. An air intake valve 52 and an exhaust valve 54 are disposed at a position facing a combustion chamber 50 of the engine 18 to open and close the connection between the combustion chamber 50 and an intake passage 56 or exhaust passage 58. The engine 18 specifically comprises an air-cooled, four-cycle, single cylinder OHV engine, and has a displacement of, for example, 163 cc.

The piston 48 is coupled with the crankshaft 22. One end of the crankshaft 22 is attached with a flywheel 60 and the distal end of the flywheel 60 is attached with the recoil starter 20. Although omitted in the drawing, the blade 32 is installed on the other end of the crankshaft 22 via the blade electromagnetic clutch 34.

Multiple permanent magnets 62 are fastened to the inside of the flywheel 60 and a magneto coil (alternator; generator) 66 is mounted on the side of a crankcase 64 so as to face the permanent magnets 62. When the crankshaft 22 is rotated by the operator's manipulation of the recoil starter 20 or reciprocal motion of the piston 48, the magneto coil 66 generates output (alternating current) in synchronous with the rotation.

The alternating current generated by the magneto coil 66 is converted to direct current by a processing circuit (not shown) to be supplied as operating power to a control ECU, authentication ECU (explained later), ignition circuit (not shown) and the like. The magneto coil 66 outputs (generates) power sufficient both for starting the engine 18 and for operating the authentication ECU, etc. The engine 18 can be started by the recoil starter 20, so it is not equipped with a battery. In other words, it is a battery-less type general purpose internal combustion engine.

A throttle body 68 is installed in the intake passage 56. A throttle valve 70 and an electric motor 72 for driving the throttle valve 70 are accommodated in the throttle body 68. A carburetor assembly (not shown) is provided at a location upstream of the throttle valve 70 and injects gasoline fuel supplied from a fuel tank (indicated by reference numeral 74 in FIGS. 1 and 2). The resulting air-fuel mixture is drawn into the combustion chamber 50 through the throttle valve 70, intake passage 56 and air intake valve 52.

Figure 4:
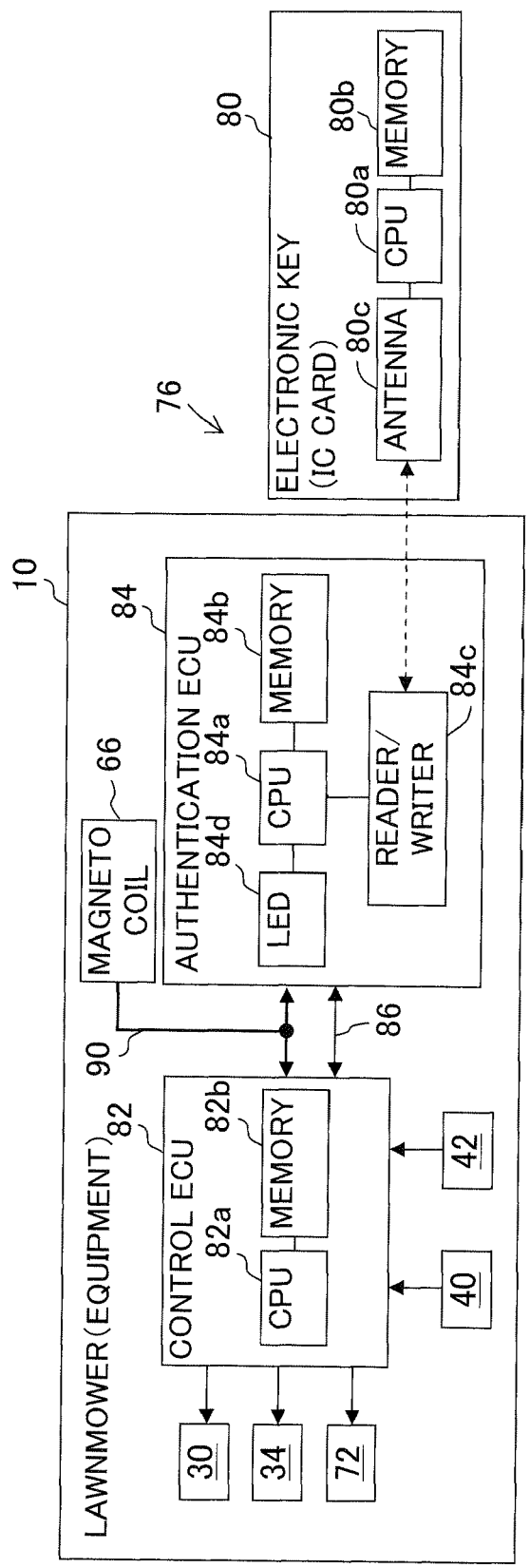
FIG. 4 is a block diagram showing the configuration of the system for the lawnmower shown in FIG. 1.

FIG. 4 is a block diagram showing the configuration of the antitheft system for the lawnmower 10 on which the engine 18 is mounted.

The antitheft system is assigned by the reference numeral 76 in FIG. 4. The system 76 is equipped with an electronic key 80 that stores authenticating data, a control ECU (second ECU) 82 that is installed in the lawnmower 10 and controls the operation of the engine 18 and other components, and an authentication ECU (first ECU) 84 that is installed in the lawnmower 10 for authenticating the key 80. As shown in FIGS. 1 and 2, the ECUs 82, 84 are both disposed at suitable locations in the lawnmower 10, i.e., inside the engine cover 16 near the recoil starter 20.

The control ECU 82 comprises a microcomputer (second microcomputer) having a CPU 82a, memory (EEPROM non-volatile memory) 82b and the like. The control ECU 82 is inputted with a drive command (ON signal) from the operator P using the drive switch 40 and with a blade operation command (ON signal) from the operator P using the blade switch 42. Upon receiving the drive command, the control ECU 82 engages the rear wheel magnetic clutch 30 to transmit the rotational output of the engine 18 to the rear wheels 12R, whereby the lawnmower 10 is self-propelled. Upon receiving the blade command, the control ECU 82 engages the blade magnetic clutch 34 to transmit the rotational output of the engine 18 to the blade 32, thereby rotating the blade 32 to rotate the blade 32 (enable mowing).

The control ECU 82 is further inputted with outputs of a throttle position sensor, crank angle sensor (neither shown), etc. Based on the inputted outputs, the ECU 82 operates the motor 72 of the throttle valve 70 to control speed Ne of the engine 18 (so as to be kept at predetermined speed, for example). However, since the control is not directly related to this invention, it will not be explained here.

The authentication ECU 84 comprises, similarly to the control ECU 82, a microcomputer (first microcomputer) having a CPU 84a, a memory (EEPROM) 84b for storing key-checking data (explained later) and other components. The authentication ECU 84 is further equipped with a reader/writer 84c for reading from the key 80 authenticating data stored therein and performing other operation and with an LED (light-emitting diode; signal lamp; information device) 84d for informing the operator P of the result of electronic key authentication (pass/fail).

The authentication ECU 84 is connected for communication with the control ECU 82 through a serial communication line 86. The ECUs 82, 84 are connected to the magneto coil 66 through a power line 90 to be supplied with operating power generated by the magneto coil 66.

The key 80 is a contact-less IC (integrated circuit) card equipped with a CPU 80a, a non-volatile memory 80b for storing authenticating data (i.e., identification data (user ID) for identifying the operator P who carries the key 80 and identification information (product ID) for identifying the model, etc., of the lawnmower 10), and an antenna 80c for exchange (input/output) with the reader/writer 84c of authenticating data, etc., by short-distance wireless communication (RFID: Radio Frequency Identification). The IC card constituting the key 80 is a card made of resin and houses the CPU 80a and other components in its interior. As shown in FIG. 1, it is made portable to be carried by the operator P.

There now follows an explanation of the certification process that is one aspect of the communication activity between the key 80 and reader/writer 84c of the authentication ECU 84. When the operator P moves the key 80 to the reader/writer 84c after the ECU 84 has been supplied with operating power from the magneto coil 66, the reader/writer 84c outputs (transmits) radio wave to the key 80.

Upon receipt of the radio wave transmitted by the reader/writer 84c, the key 80 generates power by electromagnetic induction of a built-in coil (not shown), thereby activating the CPU 80a and the like. In other words, the key 80 is not equipped with a battery or other internal power supply source but is supplied with operating power induced by the radio wave from the reader/writer 84c.

Upon being supplied with power, the CPU 80a of the key 80 outputs the authenticating data stored in the memory 80b to the reader/writer 84c through the antenna 80c. When the authenticating data is outputted from the key 80, the authentication ECU 84 uses the key-checking data stored in the memory 84b to perform an authentication check to determine whether the key 80 is an authorized key. The key-checking data is identical to the authenticating data such as the user ID and product ID.

The ECU 84 performs the authentication by comparing the authenticating data in the key 80 with the key-checking data. Specifically, the authenticating data and the key-checking data are compared each other to determine whether they are identical, and the key 80 moved to the reader/writer 84c is discriminated to be an authorized key for the lawnmower 10 if they are the same and not to be an authorized key if they do not match.

The key 80 is thus a contact-less (wireless) IC card that can input/output (communicate) authenticating data and the like when the operator P merely moves it to, but out of contact with, the reader/writer 84c of the authentication ECU 84.

Since the foregoing configuration enables transmission/reception of authenticating data and the like between the key 80 comprising a contact-less IC card and the reader/writer 84c, it is possible to avoid inconveniences that might arise in the case of transmission/reception using a wired communication means to connect an electronic key with an authentication ECU, specifically problems such as that of data communication becoming impossible owing to breaking of communication cable.

The operation of the system 76 thus configured will be explained.

Figure 5:
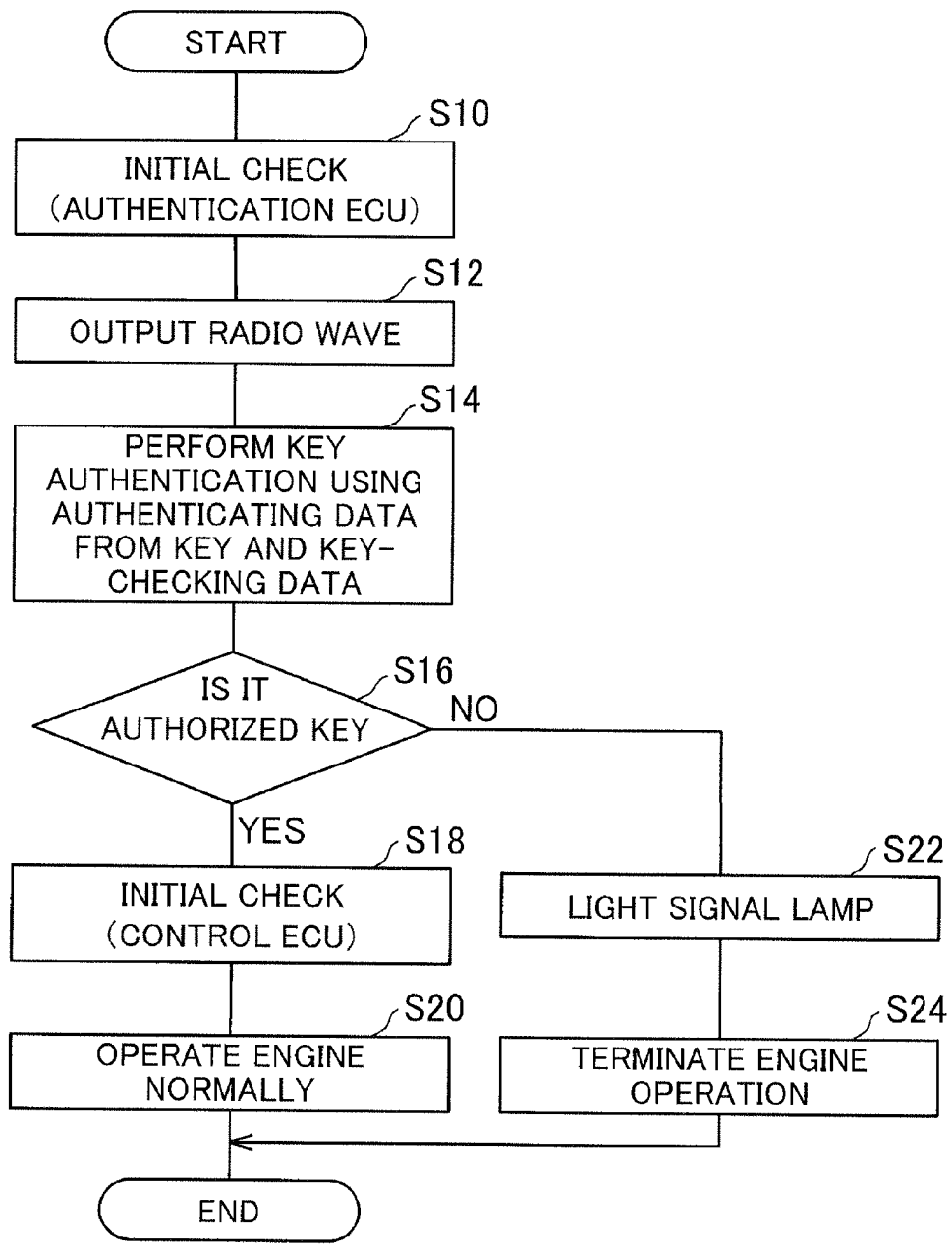
FIG. 5 is a flowchart showing the operation of the system shown in FIG. 1, specifically the sequence of operations of authentication ECU thereof.

FIG. 5 is a flowchart showing the operation of the system 76, specifically the sequence of operations of authentication ECU 84 thereof. The illustrated program is executed only once when the engine 18 is started.

When the operator P manipulates the recoil starter 20, more exactly when, as shown in FIG. 1, the operator P pulls the recoil starter 20 while holding the key 80 near the reader/writer 84c of the authentication ECU 84, the engine 18 is started, the magneto coil 66 commences power generation, and the ECU 84 is supplied with operating power.

After the ECU 84 has been supplied with operating power and activated, the program begins in S10, in which the initial check (operation check) of the microcomputer constituting the authentication ECU 84 is conducted. At this time, the initial check of the microcomputer constituting the control ECU 82 is not conducted. As a result, an authentication check can be started early and it shortens the processing time of the authentication ECU 84.

Then the program proceeds to S12, in which the reader/writer 84c outputs radio wave to the key 80 to supply operating power, and to S14, in which the authentication of the key 80 is performed using the authenticating data outputted from the key 80 and key-checking data. Thus, the authentication EUC 84 performs the authentication check when the recoil starter 20 is manipulated by the operator P and the magneto coil 66 supplies operating power to the ECU 84.

The program proceeds to S16, in which it is determined whether the key 80 was found to be an authorized key for the lawnmower 10. When the result is affirmative, the program proceeds to S18, in which a signal enabling to execute the initial check (operation check) of the microcomputer of the control ECU 82 is sent to the control EUC 82, whereafter the program is terminated. Specifically, the control ECU 82 conducts the initial check of its microcomputer upon being inputted with the signal from the authentication ECU 84. Thus, the control ECU 82 conducts the initial check after the operating power is supplied and the authentication check is performed by the authentication ECU 84.

When the result in S16 is negative, the program proceeds to S22, in which the signal lamp 84d is lit to inform the operator P that the key 80 was found to be not the authorized key, and to S24, in which the operation of the engine 18 is terminated by ignition cut-off or some other means, thereby preventing theft of the lawnmower 10.

Figure 6:
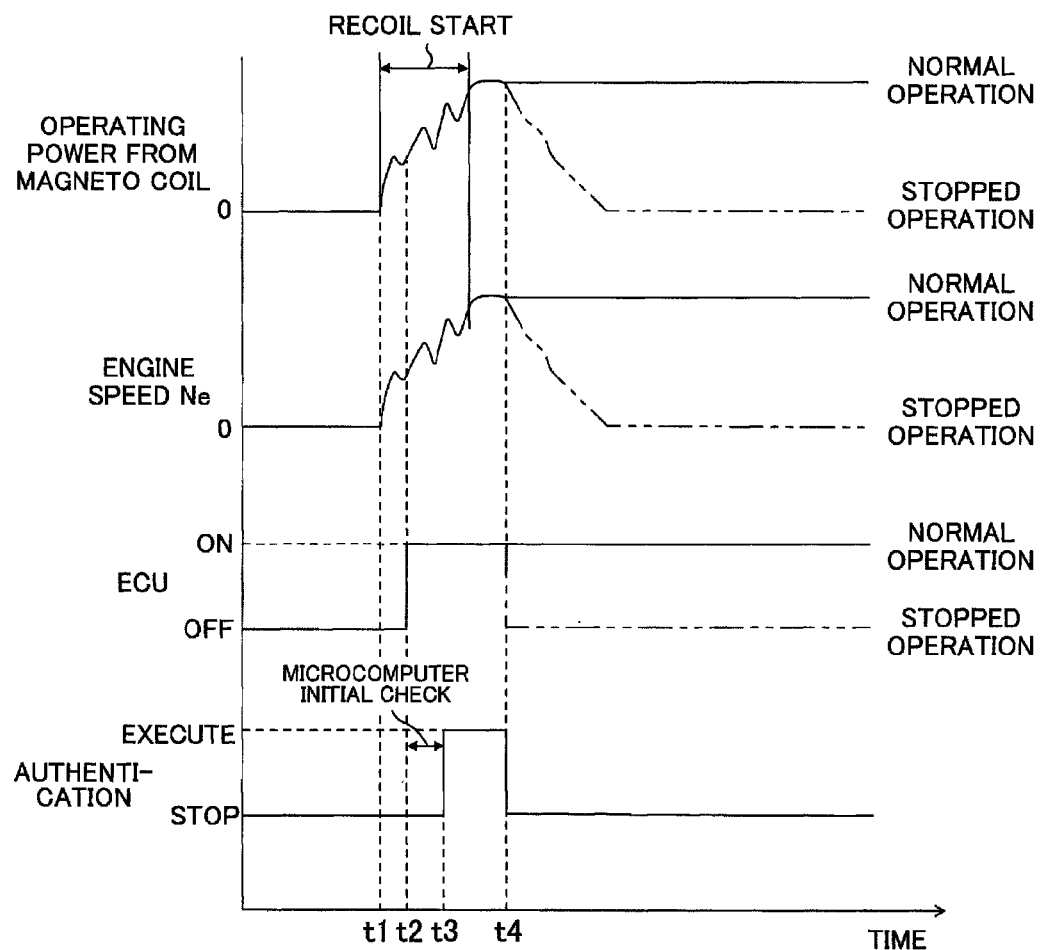
FIG. 6 is a time chart for explaining the operation of FIG. 5 flowchart.

FIG. 6 is a time chart for explaining the operation of FIG. 5 flowchart.

As shown in FIG. 6, when the recoil starter 20 is manipulated by the operator P at a time t1, the engine 18 is started, while the magneto coil 66 generates and outputs operating power. When the operating power is supplied to the authentication ECU 84, etc., at a time t2, the authentication ECU 84 is activated and the program of FIG. 5 is started, i.e., the initial check of the microcomputer of the ECU 84 is conducted (S10).

After the initial check is completed (time t3), the authentication check is performed (S12 to S16) and the key authentication is completed at a time t4. In the case where the key 80 is authenticated to be the authorized key, after the initial check of the microcomputer of the control ECU 82 is conducted (S18), the engine 18 is operated normally (S20). Specifically, as indicated by a solid line in FIG. 6, the operating power is continuously supplied from the magneto coil 66 to the engine 18, ECUs 84, 82 and other components, while the engine speed Ne is kept at a predetermined value.

In the case where the key 80 is authenticated to be not the authorized key at the time t4, the operation of the engine 18 is terminated by ignition cut-off (S24). Specifically, as indicated by an imaginary line in FIG. 6, the engine speed Ne is gradually decreased to stop the engine 18 and, along therewith, the magneto coil 66 is stopped supplying the operating power to the ECUs 84, 82, etc. Accordingly, the operations of the ECUs 84, 82 are terminated.

In this embodiment, the operation of the engine 18 is terminated in S24 of FIG. 5 (the time t4 of FIG. 6) when the key 80 is not the authorized key. However, instead of stopping the engine 18, it is possible, for example, to control the upper limit of the engine speed Ne of the engine 18, specifically to restrict the upper limit of the engine speed NE to slightly higher than the idling speed (but lower than the lowest speed at which mowing is possible). By preventing rotation of the blade 32 of the lawnmower 10, this arrangement makes lawn mowing impossible but allows the lawnmower 10 to be driven at low speed, thus providing a way to deal with cases where the operator P lost the key 80.

As stated above, this embodiment is configured to have a system (76) for preventing an equipment (10) from theft, characterized by: an internal combustion engine (18) that is mounted on the equipment and is equipped with a generator (magneto coil 66) that generates electric operating power when the engine is operated; a recoil starter (20) that is installed on the engine to be manipulatable by an operator to operate the engine; an electronic key (80) that is adapted to be carried by an operator of the equipment and stores authenticating data for identifying the operator who carries the electronic key; and an authenticator (84, S14, S16) that is installed at the equipment and performs authentication check as to whether the electronic key is an authorized key using stored key-checking data, when the authenticating data is outputted from the electronic key; wherein the authenticator performs the authentication check when the electric operating power is supplied from the generator.

Since the authentication ECU 84 is configured to perform authentication as to whether the key 80 is the authorized key not with supply of operating power from a battery but with that from the magneto coil 66 that operates in response to the operator's manipulation of the recoil starter 20, the authentication ECU 84 can be operated (installed) in the battery-less lawnmower (equipment) 10, thereby ensuring to prevent the lawnmower 10 from theft.

In the system, the authenticator (84) terminates operation of the engine, when the electronic key (80) is not authenticated to be an authorized key (S16, S24). Specifically, although the engine 18 is started once in response to the operator's manipulation of the recoil starter 20, it is immediately stopped when the key 80 is found to be not the authorized key. Therefore, the lawnmower 10 can be reliably prevented from theft.

In the system, the generator (66) generates the electric operating power for the authenticator (84) to perform the authentication check and for the engine (18) to be started. With this, it becomes possible to ensure power (operating power) needed for starting the engine 18 and operating the authentication ECU 84, thereby enabling to reliably operate the authentication ECU 84.

In the system, the authenticator (84) comprises a first electronic control (84) unit having a first microcomputer (84a), and the first electronic control unit (84) conducts an operation check of the first microcomputer and then performs the authentication check, when the electric operating power is supplied from the generator. In other words, the initial check of the microcomputer which is not necessary for the key authentication (i.e., the microcomputer of the control ECU 82) is not conducted before the authentication check. As a result, the processing time of the authentication ECU 84 can be shortened to make it possible to complete the authentication within a limited operating power supplying period.

The system further includes: an engine controller (82) that controls operation of the engine and comprises a second electronic control unit having a second microcomputer (82*a*); and the second electronic control unit (82) conducts an operation check of the second microcomputer, when the electric operating power is supplied from the generator after the authenticator performs the authentication check. In other words, the initial check of the second microcomputer which is not necessary for the key authentication is not conducted before the authentication check. Therefore, the authentication check can be started early and the initial check of the second microcomputer can be surely conducted after the authentication.

The system further includes: an informer that informs the operator, when the electronic key is not authenticated to be an authorized key. With this, it becomes possible to let the operator P recognize that the key 80 was found to be not the authorized key.

In the system, the equipment comprises an operating machine or a moving object. More specifically, the equipment comprises a lawnmower (10). The electronic key (80) comprises an IC card. With this, the foregoing effects can be achieved with the simple structure.

Although the embodiment is explained taking an operating machine, i.e., the lawnmower 10 as an example of the equipment having the system 76, it can be other kinds of equipment of battery-less type having a generator (magneto coil) that supplies operating power in response to the operator's manipulation of the recoil starter. For example, it can be machines such as cultivators, generators, snow removal machines and materials handling machines, and moving objects such as four-wheeled vehicles, two-wheeled vehicles and small electric vehicles.

Although the key 80 and the reader/writer 84*c* of the authentication ECU 84 are configured to exchange data using short-distance RFID wireless communication, it is alternatively possible to exchange data via another type of wireless communication means or wired communication means.

Although the piston displacement of the engine 18 was specified, the specified value is non-limiting example.

Japanese Patent Application No. 2008-180556, filed on Jul. 10, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for preventing an equipment from theft, having:
    an internal combustion engine that is mounted on the equipment and is equipped with a generator that generates electric operating power when the engine is operated;
    a recoil starter that is installed on the engine to be manipulatable by an operator to operate the engine;
    an electronic key that is adapted to be carried by the operator of the equipment and stores authenticating data for identifying the operator who carries the electronic key; and
    an authenticator that is installed at the equipment and performs authentication check as to whether the electronic key is an authorized key using stored key-checking data, when the authenticating data is outputted from the electronic key;
    wherein the authenticator comprises a first electronic control unit having a first microcomputer, and the first electronic control unit conducts an initial check of only the first microcomputer and then performs the authentication check, when the electric operating power is supplied from the generator.

2. The system according to claim 1, wherein the authenticator terminates operation of the engine, when the electronic key is not authenticated to be an authorized key.

3. The system according to claim 1, wherein the generator generates the electric operating power for the authenticator to perform the authentication check and for the engine to be started.

4. The system according to claim 1, further including:
    an engine controller that controls operation of the engine and comprises a second electronic control unit having a second microcomputer;
    and the second electronic control unit conducts an operation check of the second microcomputer, when the electric operating power is supplied from the generator after the authenticator performs the authentication check.

5. The system according to claim 1, further including: an informer that informs the operator, when the electronic key is not authenticated to be an authorized key.

6. The system according to claim 1, wherein the equipment comprises an operating machine or a moving object.

7. The system according to claim 6, wherein the equipment comprises a lawnmower.

8. The system according to claim 1, wherein the electronic key comprises an IC card.

* * * * *